United States Patent
Keller et al.

(10) Patent No.: US 9,538,574 B2
(45) Date of Patent: Jan. 3, 2017

(54) TECHNIQUE FOR TERMINATING CALL SET UP IN A CSFB SITUATION

(75) Inventors: Ralf Keller, Würselen (DE); Karl-Peter Ranke, Herzogenrath (DE); Andreas Witzel, Herzogenrath (DE)

(73) Assignee: TElefonaktiebolaget L M Ericsson (publ), Stockholm (SE)

( * ) Notice: Subject to any disclaimer, the term of this patent is extended or adjusted under 35 U.S.C. 154(b) by 703 days.

(21) Appl. No.: 13/877,760

(22) PCT Filed: May 23, 2011

(86) PCT No.: PCT/EP2011/002557
§ 371 (c)(1),
(2), (4) Date: Jul. 17, 2013

(87) PCT Pub. No.: WO2012/045375
PCT Pub. Date: Apr. 12, 2012

(65) Prior Publication Data
US 2013/0288671 A1    Oct. 31, 2013

Related U.S. Application Data

(60) Provisional application No. 61/389,856, filed on Oct. 5, 2010.

(51) Int. Cl.
*H04W 76/06* (2009.01)
*H04W 76/02* (2009.01)
*H04W 8/08* (2009.01)

(52) U.S. Cl.
CPC ............. *H04W 76/028* (2013.01); *H04W 8/08* (2013.01); *H04W 76/027* (2013.01)

(58) Field of Classification Search
CPC .................................................. H04W 76/028
USPC ........................................................ 455/433
See application file for complete search history.

(56) References Cited

U.S. PATENT DOCUMENTS

2003/0139182 A1*  7/2003  Bakkeby et al. ............. 455/432
2005/0272448 A1   12/2005  Tran et al.

FOREIGN PATENT DOCUMENTS

| CN | 101616395 A | 12/2009 |
|---|---|---|
| EP | 2 099 239 A1 | 9/2009 |
| EP | 2 625 877 B1 | 8/2013 |
| FR | WO 2008/033951 A2 * | 3/2008 |
| RU | 2 376 723 C2 | 12/2009 |
| WO | WO 2008/033951 A2 | 3/2008 |
| WO | WO 2012/045375 | 4/2012 |
| WO | WO 2012/045375 A1 | 4/2012 |

OTHER PUBLICATIONS

3GPP TS 23.272 V9.4.0 (2020-06) Technical specification, Circuit switched feedback in evolved packet system (EPS)release 9; Jun. 2010.*

(Continued)

*Primary Examiner* — Muthuswamy Manoharan
(74) *Attorney, Agent, or Firm* — Myers Bigel, P.A.

(57) ABSTRACT

A technique for controlling set up of a terminating call to a UE in a CSFB situation involving a first MSC paging the UE and a second MSC where the UE is performing a Location Update is described. A method implementation of this technique comprises receiving, from an HLR, a PRN message and forwarding information received in the PRN message to the second MSC.

33 Claims, 5 Drawing Sheets

(56) References Cited

OTHER PUBLICATIONS

Written Opinion of the International Searching Authority, PCT/EP2011/002557, Sep. 6, 2011.
Ericsson et al.; "CSFB for termination calls: new mobile roaming forwarding service", Change Request: 3GPP TSG SA WG2 Meeting #83; Feb. 21-25, 2011, Salt Lake City, Utah; TD S2-11xxxx; 23.272 CR; V10.2.1.; 6 pages.
ETSI TS 129 002 V10.2.0 (Apr. 2011) Digital cellular telecommunications system (Phase 2+); Universal Mobile Telecommunications System (UMTS); Mobile Application Part (MAP) specification (3GPP TS 29.002 version 10.2.0 Release 10); Part A: Title pages—p. 431.
ETSI TS 129 002 V10.2.0 (Apr. 2011) Digital cellular telecommunications system (Phase 2+); Universal Mobile Telecommunications System (UMTS); Mobile Application Part (MAP) specification (3GPP TS 29.002 version 10.2.0 Release 10); Part B: pp. 432-954.
Office Action for Corresponding Chilean Patent Application No. 00940-2013, mailed Jan. 27, 2015, 6 pp.
Keller et al.: "Enhanced mobile roaming retry for termination calls", U.S. Appl. No. 61/389,856, filed Oct. 5, 2010, 13 pp.
International Search Report, PCT/EP2011/002557, Sep. 6, 2011.
International Preliminary Report on Patentability, PCT/EP2011/002557, Sep. 4, 2011.
PCT Demand and Article 34 Amendment, PCT Application No. PCT/EP2011/02557, Jun. 15, 2012, 16 pages.
3GPP TS 23.272 V9.4.0 (Jun. 2010) Technical Specification, $3^{rd}$ Generation Partnership Project; Technical Specification Group Services and System Aspects; Circuit Switched (CS) fallback in Evolved Packet System (EPS); Stage 2 (Release 9), XP050441565 Jun. 2010, 71pp.
3GPP TS 23.018 V9.2.0 (Sep. 2010) Technical Specification, $3^{rd}$ Generation Partnership Project; Technical Specification Group Core Network and Terminals; Basic call handling; Technical realization (Release 9), XP050442259, Sep. 2010, 285pp.
Russian Decision on Grant Corresponding to Patent Application No. 2013120324; Dated: Mar. 10, 2016; Foreign Text, 11 pages; English Translation Thereof, 6 Pages.
Philippines Substantive Examination Report Corresponding to Patent Application No. 1-2013-500653; Mail Date: Apr. 26, 2016; 2 Pages.
Malaysian Examination Report Corresponding to Patent Application No. PI 2013001223; Date of Mailing: Apr. 15, 2016; 3 Pages.
3GPP TS 23.272 V9.5.0 (Sep. 2010) Technical Specification, $3^{rd}$ Generation Partnership Project; Technical Specification Group Services and System Aspects; Circuit Switched (CS) fallback in Evolved Packet System (EPS); Stage 2 (Release 9), Sep. 29, 2010, 9 pages.
Chinese Office Action, corresponding to Application No. CN 201180058555.6, dated Aug. 25, 2015, 8 pages (Chinese language), English Translation (7 pages).

\* cited by examiner

TECHNIQUE FOR TERMINATING CALL SET UP IN A CSFB SITUATION

CROSS REFERENCE TO RELATED APPLICATION

This application is a 35 U.S.C. §371 national stage application of PCT International Application No. PCT/EP2011/002557, filed on 23 May 2011, which claims priority to U.S. Provisional Application No. 61/389,856, filed on 5 Oct. 2010. The above-referenced PCT International Application was published in the English language as International Publication No. WO 2012/045375 A1 on 12 Apr. 2012. The disclosures of the applications are hereby incorporated herein in their entireties by reference.

TECHNICAL FIELD

The present disclosure generally relates to Circuit Switched Fallback (CSFB). In particular, a technique for controlling set up of a terminating call to a User Equipment (UE) in a CSFB situation is described.

BACKGROUND

CSFB is specified today in the 3$^{rd}$ Generation Partnership Project (3GPP) Technical Specification (TS) 23.272 (see, e.g., V9.4.0 of June 2010). In brief, CSFB permits in an Evolved Packet System (EPS) the provisioning of voice and other CS domain services (such as services pertaining to Unstructured Supplementary Service Data, or USSD) by re-use of CS infrastructure when the UE is served by the Evolved UMTS Terrestrial Radio Access Network (E-UTRAN). A CSFB-enabled UE, connected to E-UTRAN, may thus use 2$^{nd}$ or 3$^{rd}$ Generation (2G or 3G) technologies such as GSM Edge RAN (GERAN) or UTRAN to connect to the CS domain.

FIG. 1 illustrates an exemplary scenario in which a CSFB-enabled UE connected to E-UTRAN (via the LTE-Uu interface) uses GERAN (via the Um interface) or UTRAN (via the Uu interface) to connect to the CS domain in a CSFB situation (see section 4 of 3GPP TS 23.272). CSFB signaling is realized via the SGs interface between a Mobility Management Entity (MME) associated with the UE and a Mobile Switching Centre Server (MSC-S). The MSC-S has to be CSFB-enabled, which basically means that the MSC-S will have to be capable of maintaining SGs associations towards the MME for EPS attached UEs. A Serving GPRS Support Node (SGSN) is coupled via the S3 interface to the MME and via the Gs interface to the MSC-S.

The SGs interface to the MSC-S is used for mobility management and paging procedures between EPS and the CS domain. CSFB is triggered by paging in E-UTRAN and leads to a Location Update with respect to GERAN or UTRAN (see FIG. 1). 3GPP TS 23.018 (see, e.g., V9.2.1 of October 2010) describes basic call handling mechanisms. An exemplary call handling mechanism for a terminating call to a so-called B subscriber is shown in FIG. 2 (see section 4.2 of 3GPP TS 23.018) for a roaming UE (also called Mobile Station, or MS). The roaming UE is located in a Visited Public Land Mobile Network (VPLMNB).

As illustrated in FIG. 2, when a Gateway MSC of the called B subscriber (GMSCB, or simply GMSC) receives an ISDN User Part (ISUP) Initial Address Message (IAM) for a UE, it requests routeing information from the associated Home Location Register of the B subscriber (HLRB, or simply HLR). To this end, a Send Routing Info (SRI) message is sent to the HLR. Next, the HLR requests a roaming number (i.e., a Mobile Station Roaming Number, MSRN) from the Visitor Location Register currently associated with the B subscriber (VLRB, or simply VLR). In this regard, a Provide Roaming Number (PRN) message is transmitted to the VLR. In a further step the VLR returns the MSRN in a PRN Ack message to the HLR, which forwards the MSRN to the GMSC in a SRI Ack message. The GMSC uses the MSRN to construct an ISUP IAM, which is sent to the Visited MSC of the B subscriber (VMSCB, or simply VMSC).

Upon receipt of the IAM, the VMSC requests information to handle the incoming call from its associated VLR. If the VLR determines that the incoming call is allowed, it requests the VMSC to page the UE. In a next step, the VMSC pages the UE via a Base Station Subsystem associated with the B subscriber (BSSB) using radio interface signaling. In this context, the VMSC starts a local paging timer. When the UE responds, the VMSC informs the VLR in a Page Ack message thereof and stops the paging timer. Next, the VLR instructs the VMSC to connect the call in a Complete Call message, and the VMSC finally establishes a traffic channel to the UE.

The mechanism for handling a terminating call illustrated in FIG. 2 needs to be modified in certain CSFB scenarios. Specifically, CSFB is only available in case E-UTRAN coverage (as defined by Tracking Areas, or TAs) is overlapped by either GERAN or UTRAN coverage (as defined by, for example, Location Areas, or LAs). A general problem results from the fact that there exists no 1:1 mapping between TAs and LAs.

As shown in FIG. 3, for a terminating call the lacking congruency between TAs and LAs may have the consequence that the UE, when falling back from E-UTRAN to GERAN or UTRAN, may land in a LA that is not controlled by the "old" MSC-S towards which the SGs interface association for the UE has been established by the MME. In such a case the "old" MSC-S will not be able to terminate the call. For this reason, a so-called Roaming Retry (RR) procedure is defined in section 5.2 of 3GPP TS 23.018 to allow that call termination is tried again by the GMSC towards the "new" MSC-S controlling the cell the UE is presently camping on.

The RR procedure suggested in section 5.2 of 3GPP TS 23.018 results in the requirement that all GMSCs have to be upgraded for RR support. Such an upgrade may be difficult for network operators having MSC-S and GMSC from different vendors because in practice every MSC-S may as well play the role of a GMSC, and hence all vendors have to provide RR support and all MSC-Ss have to be upgraded. For large countries such as China hundreds of MSC-Ss thus require an update prior to launching CSFB. The fact that the GMSC is located in the home country of the subscriber while, when roaming, the serving MSC-S is located in a visited network further complicates the situation. In such a case RR support has to be coordinated among different network operators, often across international borders.

All these considerations put the current GSM Association strategy at risk, which is to mandate CSFB as the early roaming solution for Long Term Evolution (LTE) networks.

SUMMARY

Therefore, a technique for efficiently controlling set up of a terminating call in a CSFB situation is required that avoids one or more of the drawbacks of the existing RR scenario summarized above.

According to a first aspect, a method of controlling set up of a terminating call to a UE in a CSFB situation involving a first MSC paging the UE and a second MSC were the UE is performing a Location Update is provided, wherein the method is performed by the first MSC and comprises receiving, from an HLR, a PRN message and forwarding information received in the PRN message towards the second MSC. It will be appreciated that the term "MSC" also encompasses an MSC-S and a combination of an MSC-S/MSC and an associated VLR.

The first MSC may at least temporarily store the PRN message or information received therein (e.g., subscriber data) locally. The storing may be performed for forwarding and/or any other purposes. The information may be kept (e.g., in a VLR associated with the first MSC) until expiry of a timer or receipt of a notification message from the second MSC.

The method may further comprise receiving a notification message from the second MSC. In one implementation, the notification message is received during a Location Update procedure. The notification message may trigger an enhanced RR procedure to the first MSC. The enhanced RR procedure may include (or involve) the forwarding of the information received in the PRN message towards the second MSC.

The information received in the PRN message that is forwarded towards the second MSC may include one or more of the conventional MAP_PROVIDE_ROAMING_NUMBER parameters (see, e.g., section 10.2 of 3GPP TS 29.002). As an example, the information received in the PRN message and forwarded to the second MSC may include the MSC number of the first MSC. The MSC number of the first MSC may be utilized by the second MSC for the purpose of sending a PRN reply (e.g., an acknowledgement) to the first MSC.

The method performed by the first MSC may further comprise receiving, from a GMSC, a call set up request messages and forwarding the call set up request message towards the second MSC. In one implementation, the UE is paged by the first MSC in response to receipt of the call set up request message.

The first MSC may control a paging timer. The paging timer may be started, and it may be stopped again by the first MSC in response to receipt of a Cancel Location message from the HLR.

According to a first variant, the first MSC has an SGs interface association with an MME for the UE. According to a second variant that may be combined with the first variant, the second MSC has no SGs interface association with the MME for the UE.

The method may be performed in the context of the UE camping on at least one of a 2G cell and 3G cell not served by the first MSC. In the present CSFB context, the UE may camp on that cell after CSFB to 2G/3G has happened.

In one implementation, the second MSC is different from the first MSC. As an example, the first MSC may be the "old" MSC where the UE was registered before the CSFB situation, while the second MSC is the "new" MSC where the UE is performing Location Update.

According to another aspect, a method of handling set up of a terminating call to a UE in a CSFB situation involving a first MSC paging the UE and a second MSC where the UE is performing a location update is provided, wherein the method is performed by the second MSC and comprises receiving, from the first MSC, PRN information, receiving also from the first MSC, a call set up request message, and handling call set up to the UE in accordance with the PRN information.

The method performed by the second MSC may further comprise receiving a Location Update message from the UE. The Location Update message may include a Circuit Switched Mobile Terminating (CSMT) flag. In one implementation, the CSMT flag is interpreted by the second MSC to indicate to the second MSC that the Location Update is due to CSFB.

According to a further variant, the method performed by the second MSC also comprises triggering an enhanced RR procedure to the first MSC. The triggering may occur responsive to the presence of the CSMT flag in the Location Update message. Additionally, or as an alternative, triggering the enhanced RR procedure to the first MSC may comprise sending a notification message towards the first MSC. This notification message may be sent during a Location Update procedure.

The technique presented herein may be realized in the form of software, in the form of hardware, or using a combined software/hardware approach. As regards a software aspect, a computer program product comprising program code portions for performing the steps presented herein when the computer program product is executed on a computing device is provided. The computer program product may be stored on a computer-readable recording medium such as a memory chip, a CD-ROM, a hard disk, and so on. Moreover, the computer program product may be provided for download via a network connection onto such a recording medium.

According to a still further aspect, an MSC for controlling set up of a terminating call to a UE in a CSFB situation involving another MSC adapted to perform a Location Update procedure with the UE is provided. The MSC is adapted to page the UE and comprises a receiving component adapted to receive, from an HLR, a PRN message, and a forwarding component adapted to forward information received in the PRN message towards the other MSC.

With regard to another aspect, an MSC for handling set up of a terminating call to a UE in a CSFB situation involving another MSC paging the UE is provided. The MSC is adapted to perform a Location Update procedure with the UE and comprises a receiving component adapted to receive, from the other MSC, PRN information, and further adapted to receive, from the other MSC, a call set up request message, and a handling component adapted to handle call set up to the UE in accordance with the PRN information.

BRIEF DESCRIPTION OF THE DRAWINGS

Further aspects, details and advantages of the technique presented herein will become apparent from the following description of exemplary embodiments in conjunction with the drawings, wherein.

DETAILED DESCRIPTION

In the following description of exemplary embodiments, for purposes of explanation and not limitation, specific details are set forth such as specific sequences of signaling steps in order to provide a thorough understanding of the technique presented herein. It will be apparent to one skilled in the art that the technique may also be practised in other embodiments that depart from these specific details.

Moreover, those skilled in the art will appreciate that the services, functions and steps explained herein below may be implemented using software functioning in conjunction with a programmed micro processor, an Application Specific Integrated Circuit (ASIC), a Digital Signal Processor (DSP) or a general purposes computer. It will also be appreciated that while the following embodiments will primarily be described in the context of methods and devices, the technique presented herein may also be embodied in a computer program product as well as in a system comprising a computer processor and a memory coupled to the processor, wherein the memory is encoded with one or more programs that may be perform the services, functions and steps disclosed herein.

Figure 1:
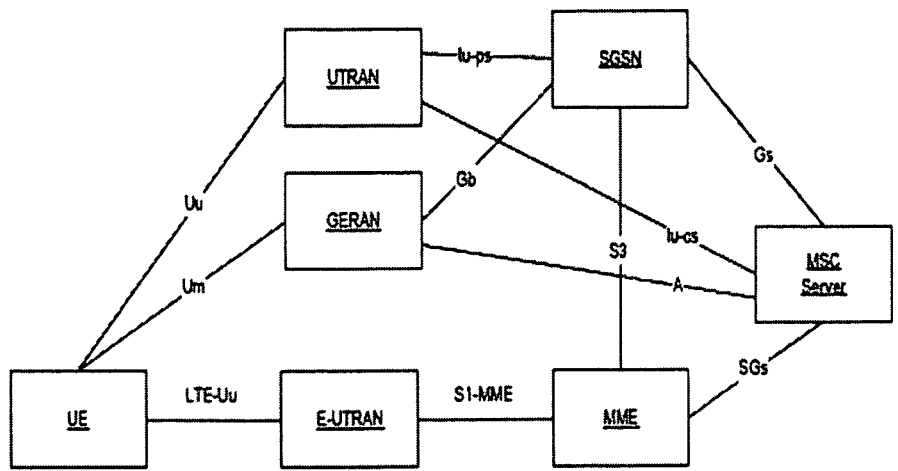
FIG. 1 illustrates the components involved in a CSFB situation.
Figure 2:
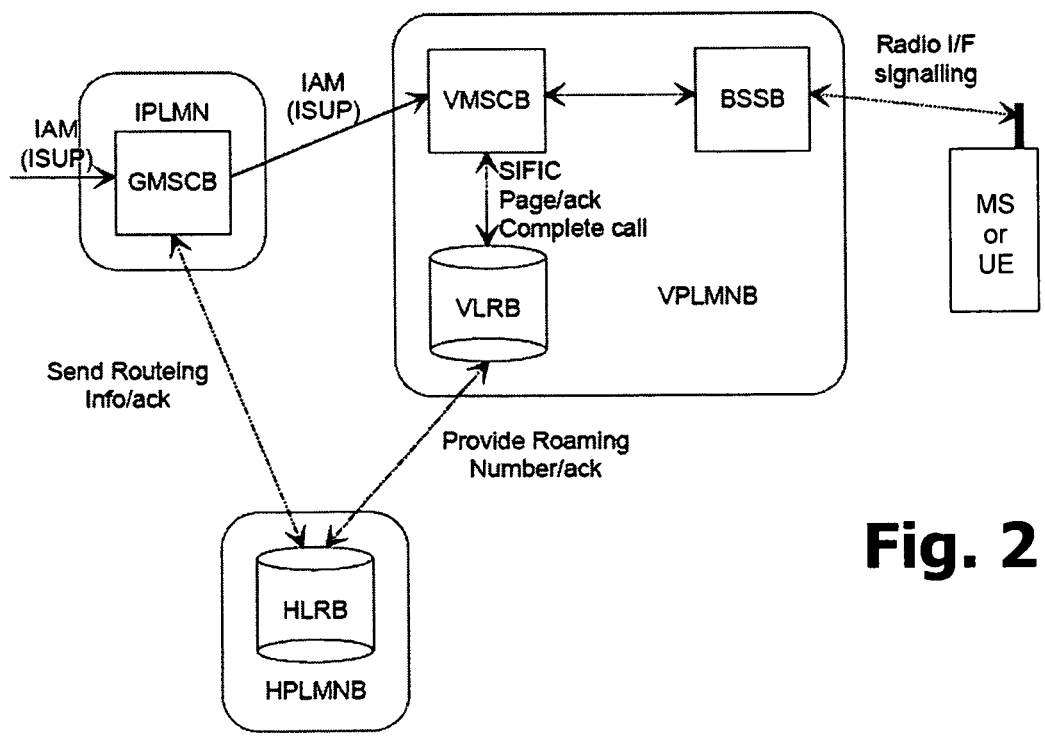
FIG. 2 illustrates a basic call handling mechanism for a terminating call.
Figure 3:
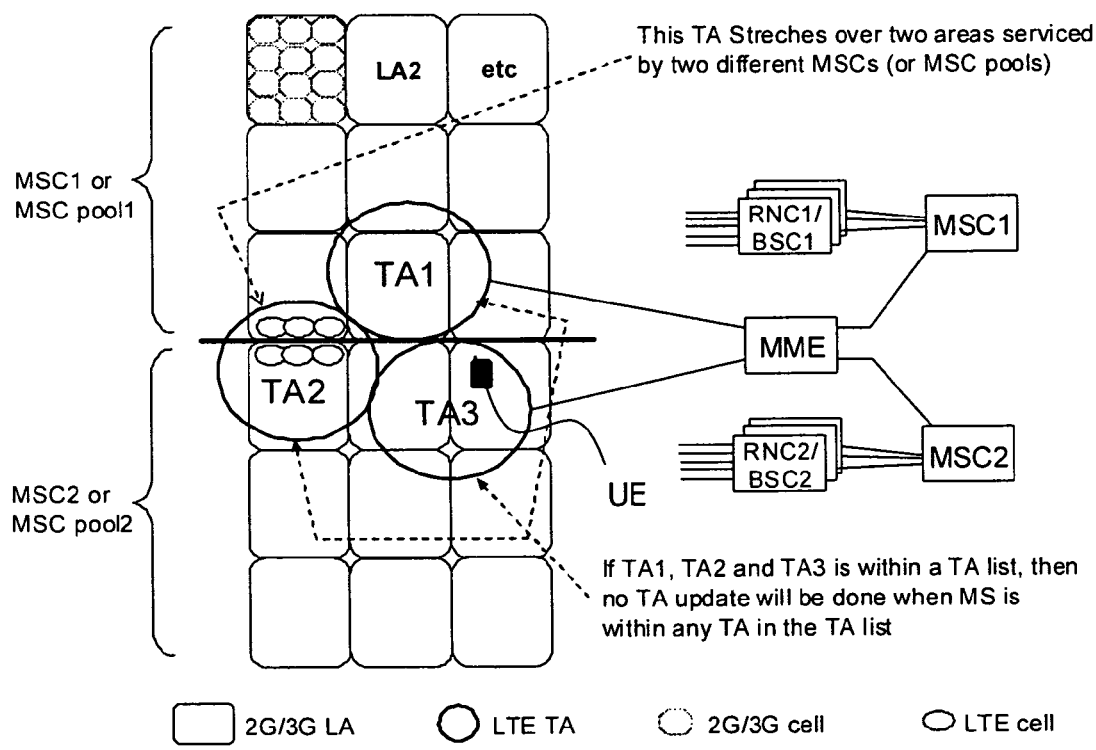
FIG. 3 illustrates the lacking congruency between Tracking Areas on the one hand and Location Areas on the other.

The technique presented herein is generally directed to setting up a terminating call to a UE in a CSFB situation. Accordingly, it will typically involve the types of network nodes schematically illustrated in FIGS. 1 and 2. The technique targets at resolving the problems that may result from a lacking congruency between TAs and LAs, in a CSFB situation (as illustrated in FIG. 3) without necessarily having an impact on the GMSC. To this end, an "enhanced" RR procedure is proposed.

Figure 4:
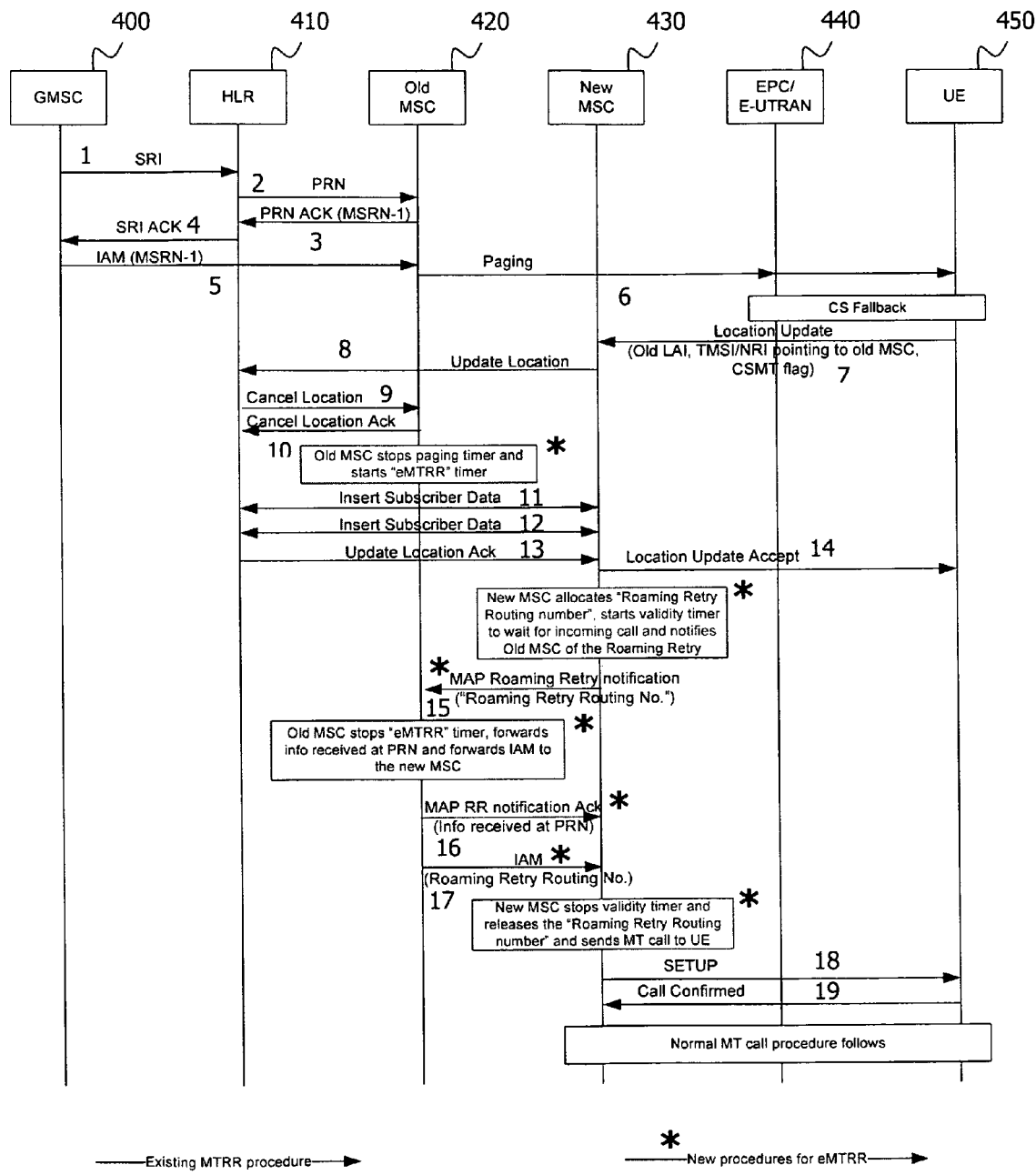
FIG. 4 illustrates an embodiment of a signaling diagram for a RR procedure in a CSFB situation.

Referring now to the signaling diagram of FIG. 4, the network nodes potentially involved in the technique presented herein are shown. Specifically, a typical network environment in which the enhanced RR procedure can be practised will comprise a GMSC 400, an HLR 410, a first MSC or MSC-S 420 (with an associated VLR as shown in FIG. 2), a second MSC or MSC-S 430 (with an associated VLR as shown in FIG. 2), an Evolved Packet Core (EPC)/E-UTRAN 440 as well as at least one UE 450.

The first MSC 420 will in the following be called "old" MSC 420 as it is the MSC where the UE 450 was initially registered (i.e., before CSFB has happened). The second MSC 430 will in the following be referred to as the "new" MSC 430 as it is the MSC where the UE 450 is performing Location Update after the CSFB.

The basic concept of the signaling embodiment that will be described with reference to FIG. 4 is that in case of CSFB and a terminating call, when the UE 450 has to perform a Location Update procedure to the new MSC 430 because it is camping on a 2G/3G cell not served by the old MSC 420 (that has the SGs association for the UE 450 to the MME), then the new MSC 430 will trigger the enhanced RR procedure to the old MSC 420. The new MSC 430 may derive the address of the old MSC 420 via existing procedures between cooperating VLRs (E interface), based on the old Location Area Identifier (LAI) and the Temporary Mobile Subscriber Identity (TMSI) received from the UE 450 during the Location Update procedure.

Figure 5:
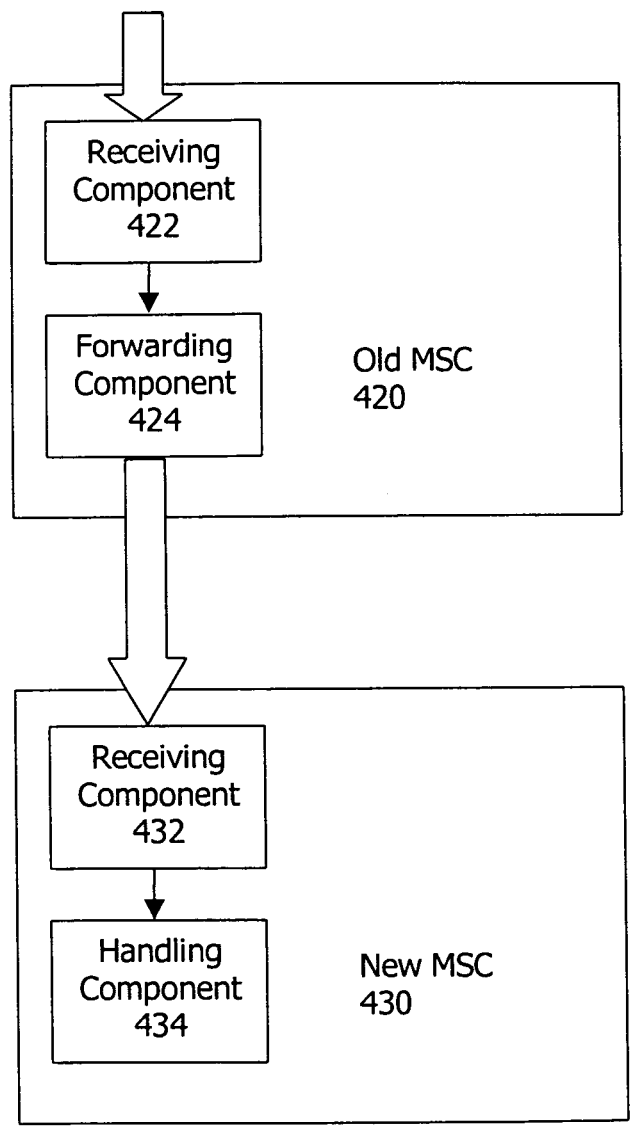
FIG. 5 illustrates MSC embodiments.

FIG. 5 illustrates the core components of the old MSC 420 as well as that of the new MSC 430. As illustrated in FIG. 5, the old MSC 20 comprises a receiving component 422 as well as a forwarding component 24. The receiving component 422 is adapted to receive, from the HRL 410, a PRN message. The forwarding component 424 is adapted to forward information received in the PRN message towards the new MSC 430.

The new MSC 430 comprises a receiving component 432 adapted to receive, from the old MSC 420, PRN information. The receiving component is further adapted to receive, also from the old MSC 420, a call set up request messages. A handling component 434 of the new MSC 430 is adapted to handle call set up to the UE 430 in accordance with the PRN information received from the old MSC 420.

Figure 6:
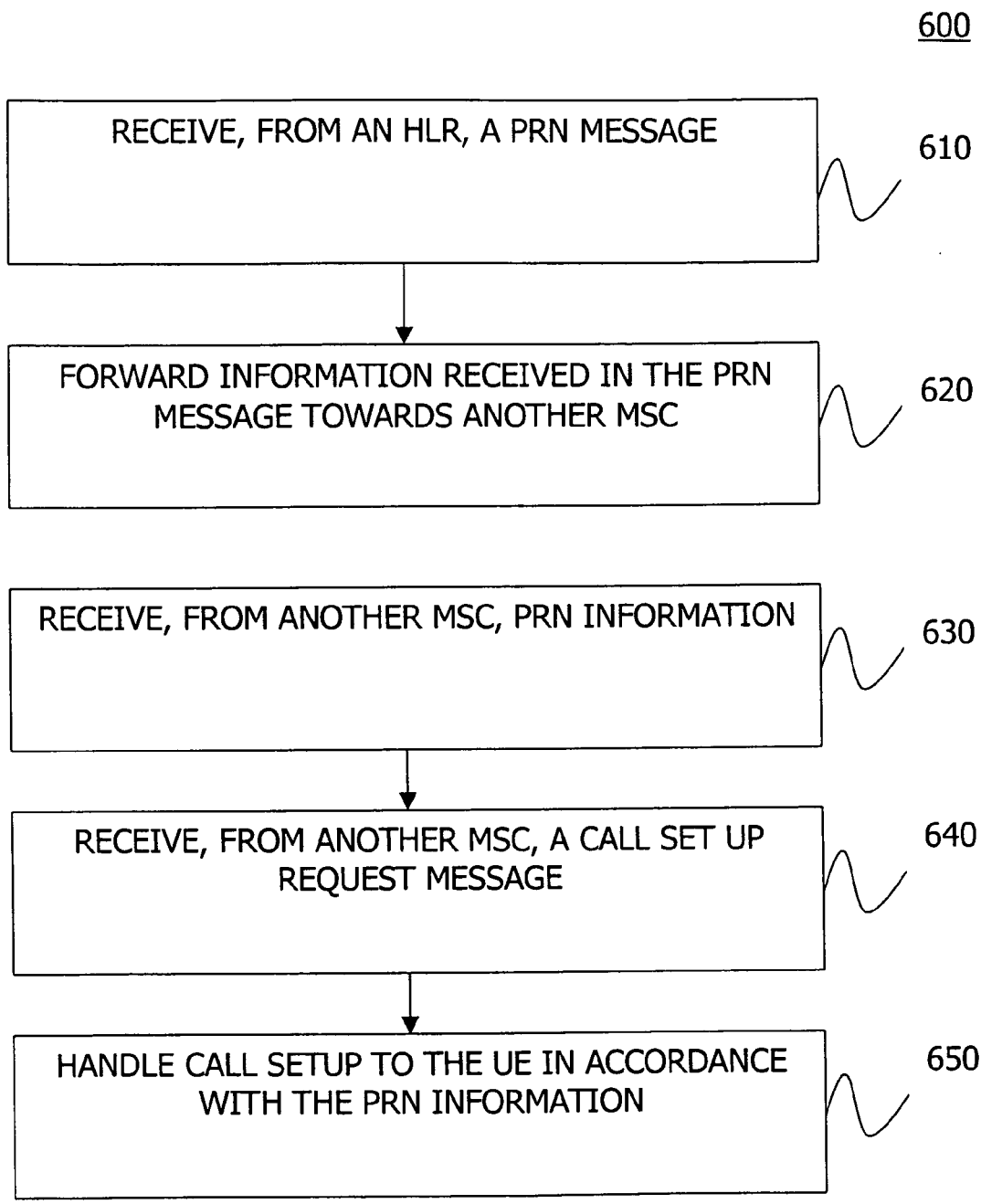
FIG. 6 illustrates a flow diagram representative of method embodiments

The operation of the old MSC 420 and the new MSC 430 will now be described in more detail with reference to the signaling diagram of FIG. 4 and the flow diagram 600 of FIG. 6.

Signaling steps 1 to 6 have already been described above with reference to FIG. 2 and will therefore not be discussed in particular detail. It is important, however, to note that in signaling step 2 the receiving component 422 of the old MSC 420 receives a PRN message from the HLR 410. Signaling step 2 thus corresponds to step 610 in FIG. 6. It will be appreciated that when referring to the old MSC 420 in this and other contexts, the VLR associated with the old MSC 420 can also be meant (see, e.g., FIG. 2 and section 10.2.1 of 3GPP TS 29.002 with respect to details of the PRN operation). Similar considerations apply with respect to the new MSC 430 and its associated VLR.

The enhanced RR procedure is initiated upon a CSFB situation as illustrated in FIG. 4 by a box connecting UE 450 and EPC/E-UTRAN 440. In this context, the UE 450 provides a Location Update message towards the new MSC 430 (signaling step 7 in FIG. 4). The Location Update message includes the old LAI, the TMSI/Network Resource Identifier (NRI) to the old MSC 420, as well as a CSMT flag. The CSMT flag indicates to the new MSC 430 that the Location Update is due to a CSFB Mobile Terminating (MT) call.

In response to receipt of the Location Update message, the new MSC 430 initiates standard procedures for Location Update (see signaling steps 8 to 14 in FIG. 4). As explained with respect to signaling step 7 above, the enhanced RR procedure is triggered by the presence of the CSMT flag in the Location Update message.

When the new MSC 430 receives the subscriber data from the HLR 410 (signaling steps 11 and 12) and has acknowledged the Location Update to the UE 450 (signaling step 14), it allocates a Roaming Retry Routing Number (RRRN), starts a validity timer to wait for the incoming call and notifies the old MSC 420 of the RR (i.e., of the enhanced RR procedure). To this end a Mobile Application Part (MAP) Roaming Retry notification message including the RRRN is sent in signaling step 15 from the new MSC 430 towards the old MSC 420. It is important to note that the new MSC 430 may send the notification message towards the old MSC 420 already during the Location Update procedure in order to decrease the call set up time. This option is not depicted in FIG. 4.

When the old MSC 420 receives a Cancel Location message in signaling step 9, it stops the paging timer (that has been started earlier upon paging the UE 450 in signaling step 6) and starts an enhanced Mobile Terminating Roaming Retry (eMTRR) timer. It does so because the old MSC 420 has the SGs association to the MME (see FIG. 1) for the UE 450. Hence, the old MSC 420 knows that the UE 450 is camping on E-UTRAN and that it has paged the UE 450. The old MSC 420 keeps the subscriber data in the VLR until the eMTRR timer expires or the MAP RR notification message is received from the new MSC 430 in signaling step 15.

Upon receipt of the MAP RR notification message in signaling step 15 from the new MSC 430, the old MSC 420 stops the eMTRR timer and forwards the information received in signaling step 2 (i.e., at the PRN procedure) towards the new MSC 430. As illustrated in FIG. 4, the information received at PRN is forwarded in an acknowledgement of the MAP RR notification message towards the new MSC 430. Specifically, in signaling step 16, the forwarding component 424 of the old MSC 420 forwards information received at the PRN procedure to the new MSC 430 (step 620 in FIG. 6). The receiving component 432 of the new MSC 430 is adapted to receive the PRN information from the old MSC 420 (step 630 in FIG. 6). It is noted that the forwarding of the information received at PRN is needed since otherwise the new MSC 430 is not getting this information (and in particular not from the GMSC 400).

As for the PRN operation and the content (i.e., the PRN information) communicated thereby, reference is made to section 10.2 of 3GPP TS 29.002, which describes the MAP_PROVIDE_ROAMING_NUMBER service. This service is used between the HLR 410 and the VLR associated with the old MSC 420. The service is invoked by the HLR 410 to request that VLR to send back the MSRN to enable the HLR 410 to instruct the GMSC 400 to route an incoming call to the called UE 450 as has been discussed above with reference to FIG. 2. The service is a confirmed service which uses the primitives described in table 10.2/1 of 3GPP TS 29.002. Specifically, at least the following service primitives (MAP_PROVIDE_ROAMING_NUMBER parameters or "PRN information") are defined:

---

Invoke Id
IMSI
MSC Number
MSISDN
LMSI
GSM Bearer Capability
Network Signal Info
Suppression Of Announcement
Call Reference Number
GMSC Address
OR Interrogation (not applicable)
OR Not Supported in GMSC (not applicable)
Alerting Pattern
CCBS Call
Supported CAMEL Phases in interrogating node (not applicable)
Additional Signal Info
Pre-paging supported (not applicable)
Long FTN Supported
Suppress VT-CSI
Offered CAMEL 4 CSIs in interrogating node (not applicable)
MT Roaming Retry Supported (not applicable)
Paging Area
Call Priority

---

In a further signaling step 17, the old MSC 420 also forwards the call set up request (e.g., IAM in ISUP or INVITE in SIP) to the new MSC 430. The receiving component 432 of the new MSC 430 thus receives a call set up request message in signaling step 17 (step 640 in FIG. 6).

In response to receipt of the call set up request message in signaling step 17, the new MSC 430 releases the allocated RRRN and stops the related validity timer for that number. Moreover, it continues the terminating call set up procedure. Specifically, the handling component 434 of the new MSC 430 handles call set up to UE 450 in accordance with the PRN information (see step 650 in FIG. 6). Call set up includes the transmission of a SETUP message to the UE 450 in signaling step 18 and the receipt of a corresponding confirmation message in signaling step 19 (see FIG. 4).

In the following, a few examples will be presented for handling call set up by the new MSC 430 in accordance with the PRN information. The examples will be discussed based on the parameters listed above.

The GSM Bearer Capability parameter, for instance, informs the new MSC 430 whether the particular call is a voice or a video call. Accordingly, the new MSC 430 either applies voice call handling or video call handling depending on the content of the GSM Bearer Capability parameter of the received PRN information. As another example, the Call Priority parameter informs the new MSC 430 whether priority handling shall be applied to the call that is to be set up to the UE 450. It should be noted that the call set up handling procedures performed by the new MSC 430 in accordance with the PRN information follow the standard procedures and will thus not be described in more detail herein.

After the call has been established, there might be up to three Media Gateways (MGWs) in the media path, controlled by the GMSC 400, the old MSC 420 and the new MSC 430, respectively. In case ISUP with Time Division Multiplex (TDM) is used between the networks (i.e., between the home network and the visited network), the old MSC 420 has to seize an MGW anyway to terminate the TDM interface. In this case there is no way to optimize the MGW usage.

In other situations it would be desirable to minimize the number of MGWs in the media path. In this regard, Bearer Independent Call Control (IBCC) signaling is not well established as international peering protocol today, and it is likely that those peering interfaces will migrate to SIP/SIP-I directly. Hence, a solution for SIP/SIP-I is needed such that the number of MGWs in the media path is minimized for Internet Protocol (IP) traffic. In the order of decreasing simplicity, four solutions will be discussed hereinafter.

According to a first solution, the actual seizure of the MGW in the old MSC 420 is delayed (i.e., is not performed before Page Response is received). Referring to the signaling sequence of FIG. 4, the old MSC 420 never receives a Page Response in case of eMTRR, but either a Cancel Location message or the novel MAP Roaming Retry notification message. Reception of those messages causes that no MGW is seized by the old MSC 420. This solutions leaves full freedom to the new MSC 430 to do an optimal MGW selection. The old MSC 420 then operates in Call Mediation Node (CMN) if the BICC is used, or SSIP proxy if SIP/SIP-I is used.

According to a second solution, the new MSC 430 re-uses the MGW already selected by the old MSC 420. To support this solution, the old MSC 420 needs to provide information on the seized MGW to the new MSC 430. The provision of such information is possible today, for example, via BICC or SIP-I signaling.

With respect to a third solution, the old MSC 420 may link out the seized MGW. Specifically, the old MSC 420 may update the MGW of the GMSC 400 to send media to the MGW of the new MSC 430 instead and remove the MGW of the old MSC 420. The old MSC 420 then operates in CMN mode if BICC is used, or as SIP proxy if SIP/SIP-I is used. The update of the media path can be done using the prior art SIP re-invite procedure with changed Session Description Protocol (SDP). In case of international roaming (or inter-provincial roaming), the media is routed via a peering point, where typically a Session Boarder Gateway (SBG) is deployed. It is suggested that the SBG stops the SIP re-invite (only those where the SBG indicated a changed IP destination) and redirects the media to the MGW of the new MSC 430. This solutions avoids impatting the MGW of the GMSC 400 which might be far away and speeds up the media redirection.

According to a fourth solution, the old MSC 420 utilizes ISUP Call Dropback or Pivot Routing indication together with the allocated RRRN to instruct the GMSC 400 to reroute the call to the new MSC 430. This solution is limited to ISUP as call control protocol. Furthermore, Call Dropback or Pivot Routing are only available on market specific ISUP versions (and are therefore not available on inter-operator borders).

As has become apparent from the above description of exemplary embodiments, the technique presented herein may provide an enhanced RR solution that allows to resolve an MSC-S mismatch due to a lacking congruency between TAs and LAs entirely within the visited network. The technique may be implemented using MSC-Ss that are anyway upgraded to support CSFB. Consequently, no GMSC upgrades are necessarily required because the GMSC is not impacted by the enhanced RR procedure in case of a terminating call and a CSFB situation. The present solution has minimal impact on the MSC-Ss in LAs close to or overlapping with TAs in E-UTRAN, and the update can also be limited to such MSC-Ss. In general, call set up delay can be reduced in particular in roaming situations. Moreover, it will be sufficient to upgrade the new MSC, the old MSC and, in certain scenarios, the HLR. In sum, the technique presented herein allows for a fast deployment of CSFB as an early LTE roaming solution, as proposed by the GSM Association.

It is believed that many advantages of the technique disclosed herein will be fully understood from the forgoing description, and it will be apparent that various changes may be made in the form, construction, and arrangement of the exemplary embodiments without departing from the scope of the invention, or without sacrificing all of its advantages. Because the technique presented herein can be varied in may ways, it will be recognized hat the invention should be limited only by the scope of the claims that follow.

The invention claimed is:

1. A method of controlling set up of a terminating call to a User Equipment, UE, in a Circuit Switched Fallback, CSFB, situation involving a first Mobile Switching Center, MSC, paging the UE and a second MSC where the UE is performing a Location Update, the method being performed by the first MSC and comprising:
   receiving, from a Home Location Register, HLR, a Provide Roaming Number, PRN, message;
   receiving, from a Gateway MSC, GMSC, a call set up request message;
   receiving a notification message from the second MSC, the notification message triggering an enhanced Roaming Retry procedure to the first MSC;
   forwarding information received in the PRN message towards the second MSC; and
   forwarding the call set up request message towards the second MSC.

2. The method of claim 1, wherein the notification message is received during a Location Update procedure.

3. The method of claim 1, wherein the enhanced Roaming Retry procedure includes the forwarding of the information received in the PRN message towards the second MSC.

4. The method of claim 1, wherein the information received in the PRN message that is forwarded towards the second MSC includes the MSC number of the first MSC.

5. The method of claim 1, further comprising paging the UE in response to receipt of the call set up request message.

6. The method of claim 1, further comprising starting a paging timer and stopping the paging timer in response to receipt of a Cancel Location message from the HLR.

7. The method of claim 1, wherein the first MSC has a Serving Gateways, SGs, interface association with a Mobility Management Entity, MME for the UE.

8. The method of claim 1, wherein the second MSC has no Serving Gateways, SGs, interface association with a Mobility Management Entity, MME for the UE.

9. The method of claim 1, wherein the UE is camping on at least one of a second generation, 2G cell and third generation, 3G cell not served by the first MSC.

10. The method of claim 1, wherein the second MSC is different from the first MSC.

11. A method of handling set up of a terminating call to a User Equipment, UE, in a Circuit Switched Fallback, CSFB, situation involving a first Mobile Switching Center, MSC, paging the UE and a second MSC where the UE is performing a Location Update, the method being performed by the second MSC and comprising:
   triggering an enhanced Roaming Retry procedure to the first MSC;
   receiving, from the first MSC, Provide Roaming Number, PRN, information;
   receiving, from the first MSC, a call set up request message; and
   handling call setup to the UE in accordance with the PRN information.

12. The method of claim 11, further comprising receiving a Location Update message from the UE.

13. The method of claim 12, wherein the Location Update message includes a Circuit Switched Mobile Terminating, CSMT, flag.

14. The method of claim 13, wherein the CSMT flag indicates to the second MSC that the Location Update is due to CSFB.

15. The method of claim 11, wherein the triggering is responsive to the presence of the CSMT flag in the Location Update message.

16. The method of claim 11, wherein triggering the enhanced Roaming Retry procedure to the first MSC comprises sending a notification message towards the first MSC.

17. The method of claim 16, wherein the notification message is sent during a Location Update procedure.

18. A computer program product for handling set up of a terminating call to a User Equipment, UE, in a Circuit Switched Fallback, CSFB, situation involving a first Mobile Switching Center, MSC, paging the UE and a second MSC where the UE is performing a Location Update, the computer program product comprising a non-transitory computer readable memory comprising program code which, when the computer program product is executed on a computing device associated with the second MSC, causes the computing device to perform operations comprising:
   triggering an enhanced Roaming Retry procedure to the first MSC;
   receiving, from the first MSC, Provide Roaming Number, PRN, information;
   receiving, from the first MSC, a call set up request message; and
   handling call setup to the UE in accordance with the PRN information.

19. The computer program product of claim 18, stored on a computer-readable recording medium.

20. A first Mobile Switching Center, MSC, for controlling set up of a terminating call to a User Equipment, UE, in a Circuit Switched Fallback, CSFB, situation involving a second MSC adapted to perform a Location Update procedure with the UE, the first MSC being adapted to page the UE and comprising:
   a receiving component adapted to:
      receive, from a Home Location Register, HLR, a Provide Roaming Number, PRN, message,
      receive, from a Gateway MSC, GMSC, a call set up request message,
      receive a notification message from the second MSC, the notification message triggering an enhanced Roaming Retry procedure to the first MSC; and
   a forwarding component adapted to:
      forward information received in the PRN message towards the second MSC, and
      forward the call set up request message towards the second MSC.

21. The first MSC of claim 20, wherein the notification message is received during a Location Update procedure.

22. The first MSC of claim 20, wherein the enhanced Roaming Retry procedure includes the forwarding of the information received in the PRN message towards the second MSC.

23. The first MSC of claim 20, wherein the information received in the PRN message that is forwarded towards the second MSC includes the MSC number of the first MSC.

24. The first MSC of claim 20, further comprising paging the UE in response to receipt of the call set up request message.

25. The first MSC of claim 20, wherein the UE is camping on at least one of a second generation, 2G cell and third generation, 3G cell not served by the first MSC.

26. A second Mobile Switching Center, MSC, for handling set up of a terminating call to a User Equipment, UE, in a Circuit Switched Fallback, CSFB, situation involving a first MSC paging the UE, the second MSC being adapted to perform a Location Update procedure with the UE and comprising:
   a triggering component adapted to trigger an enhanced Roaming Retry procedure to the first MSC;
   a receiving component adapted to receive, from the first MSC, Provide Roaming Number, PRN, information and further adapted to receive, from the first MSC, a call set up request message; and
   a handling component adapted to handle call set up to the UE in accordance with the PRN information.

27. The second MSC of claim 26, the second MSC being further adapted to perform operations comprising receiving a Location Update message from the UE.

28. The second MSC of claim 27, wherein the Location Update message includes a Circuit Switched Mobile Terminating, CSMT, flag.

29. The second MSC of claim 28, wherein the CSMT flag indicates to the second MSC that the Location Update is due to CSFB.

30. The second MSC of claim 26, wherein the triggering is responsive to the presence of the CSMT flag in the Location Update message.

31. The second MSC of claim 26, wherein triggering the enhanced Roaming Retry procedure to the first MSC comprises sending a notification message towards the first MSC.

32. The second MSC of claim 31, wherein the notification message is sent during a Location Update procedure.

33. A computer program product for controlling set up of a terminating call to a User Equipment, UE, in a Circuit Switched Fallback, CSFB, situation involving a first Mobile Switching Center, MSC, paging the UE and a second MSC where the UE is performing a Location Update, the computer program product comprising a non-transitory computer readable memory comprising program code which, when the computer program product is executed on a computing device associated with the first MSC, causes the computing device to perform operations comprising:
   receiving, from a Home Location Register, HLR, a Provide Roaming Number, PRN, message;
   receiving, from a Gateway MSC, GMSC, a call set up request message;
   receiving a notification message from the second MSC, the notification message triggering an enhanced Roaming Retry procedure to the first MSC;
   forwarding information received in the PRN message towards the second MSC; and
   forwarding the call set up request message towards the second MSC.

* * * * *

UNITED STATES PATENT AND TRADEMARK OFFICE
CERTIFICATE OF CORRECTION

PATENT NO.        : 9,538,574 B2
APPLICATION NO.   : 13/877760
DATED             : January 3, 2017
INVENTOR(S)       : Keller et al.

It is certified that error appears in the above-identified patent and that said Letters Patent is hereby corrected as shown below:

On the Title Page

In item (73), under "Assignee", in Column 1, Line 1, delete "TElefonaktiebolaget" and insert -- Telefonaktiebolaget --, therefor.

In item (56), under "OTHER PUBLICATIONS", in Column 2, Line 2, delete "(EPS)release" and insert -- (EPS) release --, therefor.

In item (74), under "Attorney, Agent, or Firm", in Column 2, Line 1, delete "Myers Bigel, P.A." and insert -- Myers Bigel Sibley & Sajovec, P.A --, therefor.

In the Specification

In Column 5, Line 2, delete "embodiments" and insert -- embodiments. --, therefor.

In Column 5, Line 61, delete "Location Area Identifier (LAI)" and insert -- Location Area Identity (LAI) --, therefor.

In Column 6, Line 1, delete "HRL" and insert -- HLR --, therefor.

In Column 6, Line 10, delete "UE 430" and insert -- UE 450 --, therefor.

In Column 8, Lines 24-25, delete "Time Division Multiplex (TDM)" and insert -- Time Division Multiplexing (TDM) --, therefor.

In Column 8, Line 32, delete "(IBCC)" and insert -- (BICC) --, therefor.

In Column 8, Line 67, delete "Boarder" and insert -- Border --, therefor.

Signed and Sealed this
Eleventh Day of April, 2017

Michelle K. Lee
*Director of the United States Patent and Trademark Office*

CERTIFICATE OF CORRECTION (continued)
U.S. Pat. No. 9,538,574 B2

In Column 9, Line 4, delete "impatting" and insert -- impacting --, therefor.

In Column 9, Lines 41-42, delete "may ways," and insert -- many ways, --, therefor.

In Column 9, Line 42, delete "hat" and insert -- that --, therefor.

In the Claims

In Column 10, Line 14, in Claim 8, delete "MME" and insert -- MME, --, therefor.